(12) United States Patent
Xiao et al.

(10) Patent No.: US 8,336,081 B2
(45) Date of Patent: *Dec. 18, 2012

(54) TRUSTED NETWORK CONNECT SYSTEM FOR ENHANCING THE SECURITY

(75) Inventors: Yuelei Xiao, Xi'an (CN); Jun Cao, Xi'an (CN); Xiaolong Lai, Xi'an (CN); Zhenhai Huang, Xi'an (CN)

(73) Assignee: China Iwncomm Co., Ltd. (CN)

( * ) Notice: Subject to any disclaimer, the term of this patent is extended or adjusted under 35 U.S.C. 154(b) by 382 days.

This patent is subject to a terminal disclaimer.

(21) Appl. No.: 12/672,860

(22) PCT Filed: Jul. 21, 2008

(86) PCT No.: PCT/CN2008/071700
§ 371 (c)(1),
(2), (4) Date: Feb. 9, 2010

(87) PCT Pub. No.: WO2009/018743
PCT Pub. Date: Feb. 12, 2009

(65) Prior Publication Data
US 2012/0005718 A1 Jan. 5, 2012

(30) Foreign Application Priority Data
Aug. 8, 2007 (CN) .......................... 2007 1 0018437

(51) Int. Cl.
*H04L 9/00* (2006.01)
*H04L 9/32* (2006.01)
(52) U.S. Cl. .................... 726/1; 726/2; 726/3; 726/4
(58) Field of Classification Search .................. 726/1–7, 726/10; 713/168–171, 150–151, 155
See application file for complete search history.

(56) References Cited

U.S. PATENT DOCUMENTS

| 7,073,073 | B1 * | 7/2006 | Nonaka et al. ................. 713/193 |
| 7,395,424 | B2 * | 7/2008 | Ashley et al. ................. 713/156 |
| 2007/0006282 | A1 | 1/2007 | Durham |
| 2007/0143629 | A1 | 6/2007 | Hardjono |

FOREIGN PATENT DOCUMENTS

| CN | 1585405 A | 2/2005 |
| CN | 1627683 A | 6/2005 |
| CN | 101159640 A | 4/2008 |

(Continued)

OTHER PUBLICATIONS

Extended European Search Report for Application No./Patent No. 08826948.5-2413/2175241, dated Nov. 9, 2011.

(Continued)

*Primary Examiner* — Hosuk Song
(74) *Attorney, Agent, or Firm* — Cantor Colburn LLP

(57) ABSTRACT

Disclosed is a trusted network connect system for enhancing the security, the system including an access requester of the system network that connects to a policy enforcement point in the manner of authentication protocol, and network-connects to the access authorizer via a network authorization transport protocol interface, an integrity evaluation interface and an integrity measurement interface, a policy enforcement point network-connects to the access authorizer via a policy enforcement interface, an access authorizer network-connects to the policy manager via a user authentication authorization interface, a platform evaluation authorization interface and the integrity measurement interface, and an access requester network-connects to a policy manager via the integrity measurement interface.

10 Claims, 2 Drawing Sheets

FOREIGN PATENT DOCUMENTS

| | | |
|---|---|---|
| EP | 2180632 A1 | 4/2010 |
| EP | 2184886 A1 | 5/2010 |
| RU | 2180987 C2 | 3/2002 |
| RU | 2300845 C2 | 6/2007 |
| WO | 2004043006 A1 | 5/2004 |
| WO | 2006006704 A2 | 1/2006 |

OTHER PUBLICATIONS

"TCG Infrastructure Working Group Reference Architecture for Interoperability (Part 1)", Internet Citation, Jun. 16, 2005.

"TCG Trusted Network Connect TNC Architecture for Interoperability, Specification Version 1.1, Revision 2", Internet Citation, May 1, 2006.

International Search Report PCT/CN2008/071700; Dated Oct. 30, 2008.

Trusted Computing Group, TCG Trusted Network Connect TNC Architecture for Interoperability, Specification Version 1.2 Revision 4 May 21, 2007.

Ye Mao et al., "Application of Trusted Network Connect (TNC) Architecture", School of Computer and Technology, Sichuan University, Chengdu, 610064, Jul. 12, 2005, p. 58-60.

* cited by examiner

TRUSTED NETWORK CONNECT SYSTEM FOR ENHANCING THE SECURITY

This application claims priority to Chinese Patent Application no. 200710018437.8, filed with the Chinese Patent Office on Aug. 8, 2007 and entitled "A Trusted Network Connect System For Enhancing The Security", which is hereby incorporated by reference in its entirety.

FIELD OF THE INVENTION

The present invention relates to the field of network security and in particular to a trusted network connect system with enhanced security.

BACKGROUND OF THE INVENTION

The issue of malicious software, e.g., viruses, worms, etc., has become highly prominent along with the informatization development. There have been more than thirty-five thousand kinds of malicious software at present, and more than forty million computers have been infected annually. It is required for inhibition of such attacks to not only address secured transport and a check for data input but also defend from the origin, i.e., each terminal connected to a network. However, traditional security defending approaches have failed to defend against numerous malicious attacks.

The international Trusted Computing Group (TCG) has established specifically for this issue a trusted-computing based network connect specification—Trusted Network Connect (TNC) or simply TCG-TNC, which includes an open terminal integrity architecture and a set of standards for guaranteeing secure interoperations. This set of standards can protect a network as demanded for a user to a protection extent defined by the user himself. The TCG-TNC is essentially intended to establish a connection starting with integrity of a terminal. Firstly, it is required to create a set of policies for the operation condition of a system in the trusted network. Only a terminal complying with a policy which is set for the network can access the network, and the network will isolate and locate those devices that do not comply with the policy. An attack of root kits can also be blocked due to the use of a Trusted Platform Module (TPM). The root kits are a kind of attack scripts, modified system program or a set of attack scripts and kits, and are intended in a target system to acquire illegally a highest control privilege of the system.

The existing TCG-TNC architecture as illustrated in FIG. 1 includes three logic entities of an Access Requester AR, a Policy Enforcement Point PEP and a Policy Decision Point PDP, which can be distributed anywhere throughout the network. This TCG-TNC architecture can be divided longitudinally into three layers of a network access layer, an integrity evaluation layer and an integrity measurement layer. The network access layer includes three components of a Network Access Requester NAR, a Policy Enforcer PE and a Network Access Authorizer NAA as well as a Network Authorization Transport Protocol Interface IF-T and a Policy Enforcement Point Interface IF-PEP. The network access layer is intended to support a traditional network access technology. The integrity evaluation layer is responsible for evaluating integrity of all entities requesting for an access to the network. This layer includes two important interfaces: an Integrity Measurement Collection Interface IF-IMC and an Integrity Measurement Verification Interface IF-IMV. Also an integrity evaluation TNC Client-Server Interface IF-TNCCS is provided between a TNC client and a TNC server. The integrity measurement layer includes two components of an Integrity Measurement Collector IMC and an Integrity Measurement Verifier IMV, which are responsible for collecting and verifying integrity-related information of an access requester.

Complete transmission of information on a trusted network connection in the existing TCG-TNC architecture is as follows: the TNC Client TNCC shall prepare and submit required platform integrity information to the Integrity Measurement Collector IMC prior to establishment of a network connection. In a terminal provided with a trusted platform module, this also means that platform information required for a network policy is hashed and then stored in respective platform configuration registers, and the TNC Server TNCS shall pre-establish and submit a platform integrity verification request to the Integrity Measurement Verifier IMV. A specific process thereof is as follows: (1) the Network Access Requestor NAR initiates an access request to the policy enforcer. (2) The policy enforcer transmits a description of the access request to the network access authorizer. (3) The network access authorizer executes a user authentication protocol with the Network Access Requester NAR upon reception of the description of the access request from the network access requester. The network access authorizer transmits the access request and user authentication success information to the TNC Server TNCS upon successful user authentication. (4) The TNC Server TNCS commences on executing bidirectional platform credential authentication with the TNC Client TNCC, e.g., an Attestation Identity Key AIK for platform verification, upon reception of both the access request and the user authentication success information transmitted from the network access authorizer. (5) The TNC Client TNCC notifies the Integrity Measurement Collector IMC about both commencement of a new network connection and a need to perform an integrity handshake protocol upon successful platform credential authentication. The Integrity Measurement Collector IMC returns required platform integrity information via the Integrity Measurement Collection Interface IF-IMC. The TMC Server TNCS submits such platform integrity information to the Integrity Measurement Verifier IMV via the Integrity Measurement Verification Interface IF-IMV. (6) The TNC Client TNCC and the TNC server TNCS perform one or more exchange of data during execution of the integrity handshake protocol until the TNC Server TNCS satisfies. (7) The TNC Server TNCS completes execution of the integrity handshake protocol on the TNC Client TNCC and transmits a recommendation to the network access authorizer to request for an access to be permitted. If there is an additional security consideration, then the policy decision point still may not permit any access of the Access Requester AR. (8) The network access authorizer passes an access decision to the policy enforcer, and the policy enforcer finally executes the decision to control the access of the Access Requester AR.

No mature product of the TCG-TNC architecture has ever been put into the market at present. Some important techniques of the TCG-TNC architecture have been still in a phase of research and standardization and generally suffer from the following drawbacks:

1. Poor extendibility. Since a predefined secure channel exists between the policy enforcement point and the policy decision point and the policy decision point possibly manages a large number of policy enforcement points, the policy decision point has to configure a large number of secure channels, thereby causing complicated management and consequential poor extendibility.

2. A complicated key negotiation process. Since data on a network access layer has to be protected for security, a secure channel has to be established between the Access Requester AR and the policy decision point, that is, session key negotiation has to be performed there. However, data protection is also required between the Access Requester AR and the policy enforcement point, so session key negotiation has to be performed again between the Access Requester AR and the policy enforcement point, thus complicating the key negotiation process.

3. Relatively low security. A primary key resulting from negotiation between the Access Requester AR and the policy decision point is passed from the policy decision point to the policy enforcement point. Passing of the key over the network may introduce a new security attack point to lower security. Furthermore, the dual session key negotiation uses the same primary key, which may also lower security throughout the trusted network connect architecture.

4. The Access Requester AR may be unable to verify an AIK certificate of the policy decision point for validity. During the platform credential authentication process, the Access Requester AR and the policy decision point use AIK private keys and certificates for bidirectional platform credential authentication and both of them have to verify the AIK certificates for validity. If the policy decision point is a network access service provider of the Access Requester AR, then the Access Requester AR can not access any network without trusted network connection, that is, the AIK certificate of the policy decision point can not be verified for validity, which would be insecure.

5. Platform integrity evaluation is not peer-to-peer. In the TCG-TNC architecture, the policy decision point performs platform integrity evaluation on the Access Requester AR, but the Access Requester AR will not perform platform integrity evaluation on the policy decision point. If the policy decision point has an untrusted platform, then it will be insecure for the Access Requester AR to be connected to an untrusted device, but a peer-to-peer trust is necessary in an Ad Hoc network.

SUMMARY OF THE INVENTION

The invention provides a trusted network connect system with enhanced security, which can solve the technical problems in the prior art that security is relatively low, the Access Requester AR may fail to verify the AIK certificate for validity and platform integrity evaluation is not peer-to-peer, etc.

Technical implementation solutions of the invention are as follows:

A trusted network connect system with enhanced security includes an Access Requester AR and a Policy Enforcement Point PEP, where the system further includes an Access Authorizer AA and a Policy Manger PM;

the Access Requester AR and the Policy Enforcement Point PEP are networked in an authentication protocol, the Access Requester AR and the Access Authorizer AA are networked via a Network Authorization Transport Protocol Interface IF-T and an integrity evaluation TNC Client-Server Interface IF-TNCCS, both the Access Requester AR and the Access Authorizer AA are provided with Integrity Measurement Interfaces IF-Ms, the Policy Enforcement Point PEP and the Access Authorizer AA are networked via a Policy Enforcement Point Interface IF-PEP, and the Access Authorizer AA and the Policy Manager PM are networked via a User Authentication Authorization Interface IF-UAA and a Platform Evaluation Authorization Interface IF-PEA; where the Network Authorization Transport Protocol Interface IF-T is a protocol interface via which bidirectional user authentication and key negotiation between the Access Requester AR and the Access Authorizer AA is performed and mutual access control of the Access Requester AR and the Access Authorizer AA is performed;

the integrity evaluation TNC Client-Server Interface IF-TNCCS is a protocol interface via which platform integrity evaluation between the Access Requester AR and the Access Authorizer AA is performed through verifying, by the Policy Manager PM, AIK certificates of the Access Requester AR and the Access Authorizer AA for validity and through verifying, by the Policy Manager PM, platform integrity of the Access Requester AR and the Access Authorizer AA;

the Integrity Measurement Interface IF-M is a protocol interface via which platform integrity-related information of the Access Requester AR and the Access Authorizer AA is collected and verified;

the Policy Enforcement Point Interface IF-PEP is a protocol interface via which a decision of the Access Authorizer AA is executed;

the User Authentication Authorization Interface IF-UAA is a protocol interface via which bidirectional user authentication and key negotiation between the Access Requester AR and the Access Authorizer AA is performed and mutual access control between the Access Requester AR and the Access Authorizer AA is performed;

the Platform Evaluation Authorization Interface IF-PEA is a protocol interface via which platform integrity evaluation between the Access Requester AR and the Access Authorizer AA is performed, the Policy Manager PM verify the AIK certificates of the Access Requester AR and the Access Authorizer AA for validity, and the Policy Manager PM verifies platform integrity of the Access Requester AR and the Access Authorizer AA.

Preferably, the Access Requester AR includes a Network Access Requester NAR, a TNC Client TNCC, and an Integrity Measurement Collector $IMC_1$ and an Integrity Measurement Verifier $IMV_1$ of the Access Requester AR, where the Network Access Requester NAR communicates with the TNC Client TNCC over a data bearer, the TNC Client TNCC communicates with the Integrity Measurement Collector $IMC_1$ of the Access Requester AR via an Integrity Measurement Collection Interface IF-IMC and the TNC Client TNCC communicates with the Integrity Measurement Verifier $IMV_1$ of the Access Requester AR via an Integrity Measurement Verification Interface IF-IMV;

the Policy Enforcement Point PEP includes a Policy Executor PE for executing a decision of the Access Authorizer AA;

the Access Authorizer AA includes a Network Access Authorizer NAA, a TNC Server TNCS, and an Integrity Measurement Verifier $IMV_2$ of and an Integrity Measurement Collector $IMC_2$ of the Access Authorizer AA, where the Network Access Authorizer NAA communicates with the TNC Server TNCS over a data bearer, the TNC Server TNCS communicates with the Integrity Measurement Collector $IMC_2$ of the Access Authorizer AA via the Integrity Measurement Collection Interface IF-IMC and the TNC Server TNCS communicates with the Integrity Measurement Verifier $IMV_2$ of the Access Authorizer AA via the Integrity Measurement Verification Interface IF-IMV;

the Policy Manager PM includes a User Authentication Service Unit UASU and a Platform Evaluation Service Unit PESU, where the User Authentication Service Unit UASU communicates with the Platform Evaluation Service Unit PESU over a data bearer;

the Network Access Requester NAR communicates with the Policy Enforcer PE in the authentication protocol, the Policy Enforcer PE communicates with the Network Access Authorizer NAA via the Policy Enforcement Point Interface IF-PEP, the Network Access Requester NAR communicates with the Network Access Authorizer NAA via the Network Authorization Transport Protocol Interface IF-T, and the Network Access Authorizer NAA communicates with the User Authentication Service Unit UASU via the User Authentication Authorization Interface IF-UAA;

the TNC Client TNCC communicates with the TNC Server TNCS via the integrity evaluation TNC Client-Server Interface IF-TNCCS, and the TNC Server TNCS communicates with the Platform Evaluation Service Unit PESU via the Platform Evaluation Authentication Interface IF-PEA;

the Integrity Measurement Collector $IMC_1$ of the Access Requester AR communicates with the Integrity Measurement Verifier $IMV_2$ of the Access Authorizer AA via the Integrity Measurement Interface IF-M, and the Integrity Measurement Verifier $IMV_1$ of the Access Requester AR communicates with the Integrity Measurement Collector $IMC_2$ of the Access Authorizer AA via the Integrity Measurement Interface IF-M.

Preferably, the Integrity Metric Collector $IMC_1$ of the Access Requester AR is a component for collecting platform integrity information prepared by the TNC Client TNCC; the Integrity Measurement Verifier $IMV_1$ of the Access Requester AR is a component for verifying platform integrity information of the Access Authorizer AA transmitted from the TNC Server TNCS; the Integrity Measurement Collector $IMC_2$ of the Access Authorizer AA is a component for collecting platform integrity information prepared by the TNC Server TNCS; and the Integrity Measurement Verifier $IMV_2$ of the Access Authorizer AA is a component for verifying platform integrity information of the Access Requester AR transmitted from the TNC Client TNCC.

Preferably, the Access Requester AR includes a Network Access Requester NAR, a TNC Client TNCC, and an Integrity Measurement Collector $IMC_1$ of the Access Requester AR, where the Network Access Requester NAR communicates with the TNC Client TNCC over a data bearer, the TNC Client TNCC communicates with the Integrity Measurement Collector $IMC_1$ of the Access Requester AR via an Integrity Measurement Collection Interface IF-IMC;

the Policy Enforcement Point PEP includes a Policy Executor PE for executing a decision of the Access Authorizer AA;

the Access Authorizer AA includes a Network Access Authorizer NAA, a TNC Server TNCS, and an Integrity Measurement Collector $IMC_2$ of the Access Authorizer AA, where the Network Access Authorizer NAA communicates with the TNC Server TNCS over a data bearer, the TNC Server TNCS communicates with the Integrity Measurement Collector $IMC_2$ of the Access Authorizer AA via the Integrity Measurement Collection Interface IF-IMC;

the Policy Manager PM includes a User Authentication Service Unit UASU, a Platform Evaluation Service Unit PESU and an Integrity Measurement Verifier IMV, where the User Authentication Service Unit UASU communicates with the Platform Evaluation Service Unit PESU over a data bearer, and the Platform Evaluation Service Unit PESU communicates with the Integrity Measurement Verifier IMV via an Integrity Measurement Verification Interface IF-IMV;

the Network Access Requester NAR communicates with the Policy Enforcer PE in the authentication protocol, the Policy Enforcer PE communicates with the Network Access Authorizer NAA via the Policy Enforcement Point Interface IF-PEP, the Network Access Requester NAR communicates with the Network Access Authorizer NAA via the Network Authorization Transport Protocol Interface IF-T, and the Network Access Authorizer NAA communicates with the User Authentication Service Unit UASU via the User Authentication Authorization Interface IF-UAA;

the TNC Client TNCC communicates with the TNC Server TNCS via the integrity evaluation TNC Client-Server Interface IF-TNCCS, and the TNC Server TNCS communicates with the Platform Evaluation Service Unit PESU via the Platform Evaluation Authentication Interface IF-PEA;

the Integrity Measurement Collector $IMC_1$ of the Access Requester AR communicates with the Integrity Measurement Verifier IMV of the Policy Manager PM via the Integrity Measurement Interface IF-M, and the Integrity Measurement Collector $IMC_2$ of the Access Authorizer AA communicates with the Integrity Measurement Verifier IMV of the Policy Manager PM via the Integrity Measurement Interface IF-M.

Preferably, the Integrity Measurement Collector $IMC_1$ of the Access Requester AR is a component for collecting platform integrity information prepared by the TNC Client TNCC; the Integrity Measurement Collector IMC of the Access Authorizer AA is a component for collecting platform integrity information prepared by the TNC Server TNCS; and the Integrity Measurement Verifier IMV of the Policy Manager PM is a component for receiving platform integrity verification requirements predefined by the TNC Client TNCC and the TNC Server TNCS and for verifying platform integrity of the Access Requester AR and the Access Authorizer AA.

Preferably, both the Access Requester AR and the Access Authorizer AA are logic entities with trusted platform modules.

As can be apparent from the foregoing technical solutions, access control based on tri-element peer authentication is performed at the network access layer to achieve enhanced security and simplified key management of the trusted network connect architecture.

Furthermore, platform integrity evaluation according to the invention can select implementation way thereof according to actual condition. In the first approach, the policy manager performs centralized authentication of AIK certificates of the access requester and the access authorizer, and the access requester and the access authorizer verify locally platform integrity of one another, and this approach is applicable to the case that both the access requester and the access authorizer can access a database storing standard integrity measure value of the respective components to thereby achieve enhanced security and simplified key management of the trusted network connect architecture. In the second approach, both AIK certificate authentication and platform integrity verification of the access requester and the access authorizer are performed by the policy manager to thereby achieve simplified key management and integrity verification mechanisms, further enhanced security and an extended application scope of the trusted network connect architecture.

Furthermore, the invention performs not only bidirectional user authentication of the access requester and the access authorizer at the network access layer but also bidirectional platform integrity evaluation of the access requester and the access authorizer at the integrity evaluation layer to thereby enhance security throughout the trusted network connect architecture. Furthermore, security throughout the trusted network connect architecture is further enhanced due to the use of the tri-element peer authentication protocol, i.e., a third party-based bidirectional authentication protocol, at both the network access layer and the integrity evaluation layer.

Figure 1:
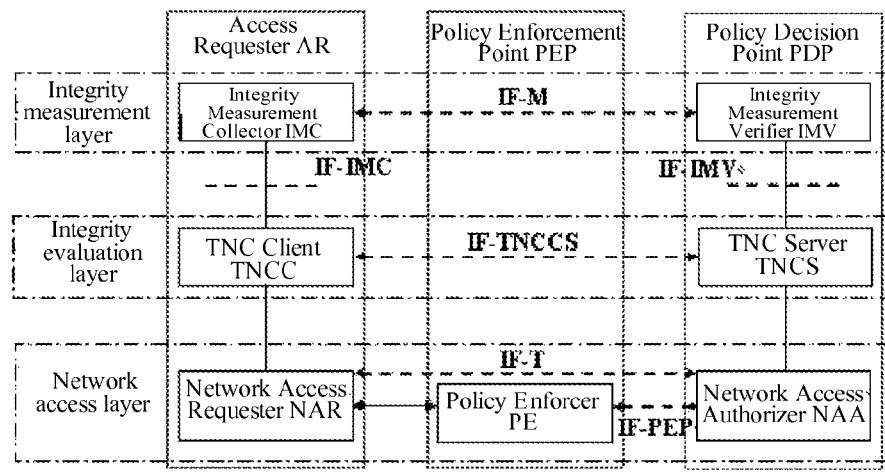
FIG. 1 is a schematic diagram of an existing basic architecture of TCG-TNC.

Reference numerals are denoted below:

PDP: Policy Decision Point; AR: Access Requester; PEP: Policy Enforcement Point; AA: Access Authorizer; PM: Policy Manager; $IMC_1$: Integrity Measurement Collector of the Access Requester AR; $IMV_1$: Integrity Measurement Verifier of the Access Requester AR; $IMV_2$: Integrity Measurement Verifier of the Access Authorizer AA; $IMC_2$: Integrity Measurement Collector of the Access Authorizer AA; IMV: Integrity Measurement Verifier of the Policy Manger PM; TNCC: TNC Client; TNCS: TNC Server; PESU: Platform Evaluation Service Unit; NAR: Network Access Requester; PE: Policy Enforcer; NAA: Network Access Authorizer; UASU: User Authentication Service Unit; IF-T: Network Authorization Transport Protocol Interface, which is a protocol interface between the Network Access Requester NAR and the Policy Enforcer PE; IF-PEP: Policy Enforcement Point Interface, which is a protocol interface between the Policy Enforcer PE and the Network Access Authorizer NAA; IF-UAA: User Authentication Authorization Interface, which is a protocol interface between the Network Access Authorizer NAA and the User Authentication Service Unit USAU; IF-TNCCS: Integrity Evaluation TNC Client-Server Interface, which is a protocol interface between the TNC Client TNCC and the TNC Server TNCS; IF-PEA: Platform Evaluation Authorization Interface, which is a protocol interface between the TNC Server TNCS and the Platform Evaluation Service Unit PESU; IF-IMC: Integrity Measurement Collection Interface, which is both a protocol interface between the TNC client TNCC and the Integrity Measurement Collector $IMC_1$ of the Access Requester AR and a protocol interface between the TNC Server TNCS and the Integrity Measurement Collector $IMC_2$ of the Access Authorizer AA; IF-IMV: Integrity Measurement Verification interface, which is a protocol interface between the TNC Client TNCC and the Integrity Measurement Verifier $IMV_1$ of the Access Requester AR, a protocol interface between the TNC Server TNCS and the Integrity Measurement Verifier $IMV_2$ of the Access Authorizer AA and a protocol interface between the Platform Evaluation Service Unit PESU and the Integrity Measurement Verifier of the Policy Manger PM; IF-M: Integrity Measurement Interface, which is a protocol interface between the Integrity Measurement Collector $IMC_1$ of the Access Requester AR and the Integrity Measurement Verifier $IMV_2$ of the Access Authorizer AA, a protocol interface between the Integrity Measurement Verifier $IMV_1$ of the Access Requester AR and the Integrity Measurement Collector $IMC_2$ of the Access Authorizer AA, a protocol interface between the Integrity Measurement Collector $IMC_2$ of the Access Authorizer AA and the Integrity Measurement Verifier IMV of the Policy Manager PM, and a protocol interface between the Integrity Measurement Collector $IMC_1$ of the Access Requester AR and the Integrity Measurement Verifier IMV of the Policy Manager PM.

DETAILED DESCRIPTION OF THE INVENTION

Since various existing networks, particularly wired networks, are mostly deployed in the TCG-TNC architecture, the invention addresses the trusted network connect architecture with enhanced security established over the TCG-TNC architecture.

Figure 2:
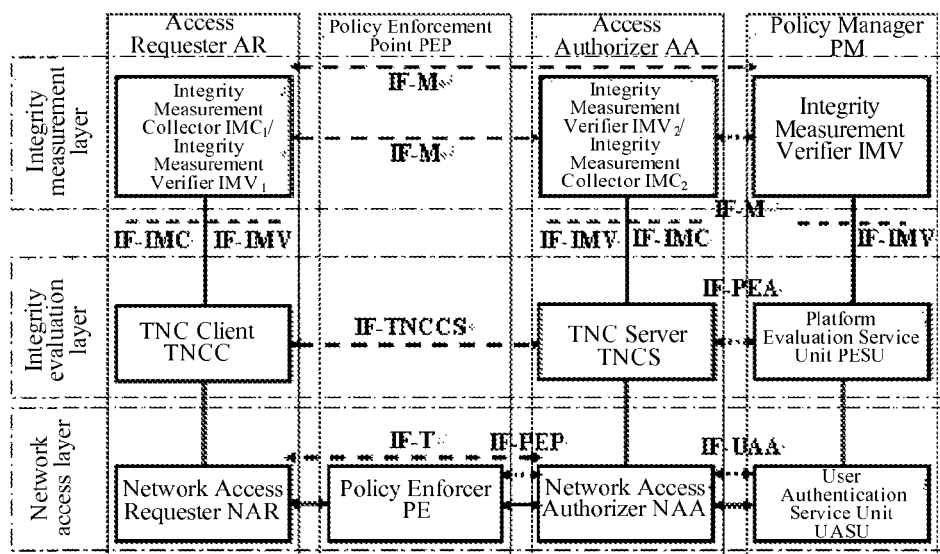
FIG. 2 is a schematic diagram of an basic architecture of TNC according to the invention.

Referring to FIG. 2, the invention mainly includes four logic entities of an Access Requester AR, a Policy Enforcement Point PEP, an Access Authorizer AA and a Policy Management PM, which can be distributed anywhere throughout the network. The Access Requester AR is also referred to as a requester, a user station, etc., and the Policy Management PM is also referred to as an authentication server, a trusted server, a background server, etc. The Access Requester AR and the Policy Enforcement Point PEP are networked in an authentication protocol, the Policy Enforcement Point PEP and the Access Authorizer AA are networked via a Policy Enforcement Point Interface IF-PEP, the Access Requester AR and the Access Authorizer AA are networked via a Network Authorization Transport Protocol Interface IF-T and an integrity evaluation TNC Client-Server Interface IF-TNCCS, both the Access Requester AR and the Access Authorizer AA are provided with Integrity Measurement Interfaces IF-Ms, and the Access Authorizer AA and the Policy Manager PM are networked via a User Authentication Authorization Interface IF-UAA and a Platform Evaluation Authorization Interface IF-PEA.

In a first embodiment of the invention, the Access Requester AR mainly includes a Network Access Requester NAR, a TNC Client TNCC, an Integrity Measurement Collector $IMC_1$ of the Access Requester AR, and an Integrity Measurement Verifier $IMV_1$ of the Access Requester AR. The Network Access Requester NAR communicates with the TNC Client TNCC over a data bearer to forward a message of the TNC Client TNCC. The TNC Client TNCC communicates with the Integrity Measurement Collector $IMC_1$ of the Access Requester AR via an Integrity Measurement Collection Interface IF-IMC and with the Integrity Measurement Verifier $IMV_1$ of the Access Requester AR via an Integrity Measurement Verification Interface IF-IMV to enable communication between the Integrity Measurement Collector $IMC_1$ of the Access Requester AR and an Integrity Measurement Verifier $IMV_2$ of the Access Authorizer AA and between the Integrity Measurement Verifier $IMV_1$ of the Access Requester AR and an Integrity Measurement Collector $IMC_2$ of the Access Authorizer AA.

The Policy Enforcement Point PEP mainly includes a Policy Executor PE responsible for executing a decision of the access authorizer.

The Access Authorizer AA mainly includes a Network Access Authorizer NAA, a TNC Server TNCS, the Integrity Measurement Verifier $IMV_2$ of the Access Authorizer AA, and the Integrity Measurement Collector $IMC_2$ of the Access Authorizer AA. The Network Access Authorizer NAA communicates with the TNC Server TNCS over a data bearer to forward a message of the TNC Server TNCS. The TNC Server TNCS communicates with the Integrity Measurement Collector $IMC_2$ of the Access Authorizer AA via the Integrity Measurement Collection Interface IF-IMC and with the Integrity Measurement Verifier $IMV_2$ of the Access Authorizer AA via the Integrity Measurement Verification Interface IF-IMV to enable communication between the Integrity Measurement Verifier $IMV_2$ of the Access Authorizer AA and the Integrity Measurement Collector $IMC_1$ of the Access Requester AR and between the Integrity Measurement Collector $IMC_2$ of the Access Authorizer AA and the Integrity Measurement Verifier $IMV_1$ of the Access Requester AR.

The Policy Manager PM mainly includes a User Authentication Service Unit UASU and a Platform Evaluation Service Unit PESU. The User Authentication Service Unit UASU communicates with the Platform Evaluation Service Unit PESU over a data bearer to forward a message of the Platform Evaluation Service Unit PESU.

In a second embodiment of the invention, the Access Requester AR mainly includes a Network Access Requester NAR, a TNC Client TNCC, and an Integrity Measurement Collector $IMC_1$ of the Access Requester AR. The Network Access Requester NAR communicates with the TNC Client TNCC over a data bearer to forward a message of the TNC Client TNCC. The TNC Client TNCC communicates with the Integrity Measurement Collector $IMC_1$ of the Access Requester AR via an Integrity Measurement Collection Interface IF-IMC to enable communication between the Integrity Measurement Collector $IMC_1$ of the Access Requester AR and an Integrity Measurement Verifier IMV of a Policy Manager PM.

The Policy Enforcement Point PEP mainly includes a Policy Executor PE responsible for executing a decision of the access authorizer.

The Access Authorizer AA mainly includes a Network Access Authorizer NAA, a TNC Server TNCS, and an Integrity Measurement Collector $IMC_2$ of the Access Authorizer AA. The Network Access Authorizer NAA communicates with the TNC Server TNCS over a data bearer to forward a message of the TNC Server TNCS. The TNC Server TNCS communicates with the Integrity Measurement Collector $IMC_2$ of the Access Authorizer AA via the Integrity Measurement Collection Interface IF-IMC to enable communication between the Integrity Measurement Collector $IMC_2$ of the Access Authorizer AA and the Integrity Measurement Verifier IMV of the Policy Manager PM.

The Policy Manager PM mainly includes a User Authentication Service Unit UASU, a Platform Evaluation Service Unit PESU and an Integrity Measurement Verifier IMV. The User Authentication Service Unit UASU communicates with the Platform Evaluation Service Unit PESU over a data bearer to forward a message of the Platform Evaluation Service Unit PESU. The Platform Evaluation Service Unit PESU communicates with the Integrity Measurement Verifier IMV via an Integrity Measurement Verification Interface IF-IMV to enable communication between the Integrity Measurement Verifier IMV, and the Integrity Measurement Collector $IMC_1$ of the Access Requester AR and the Integrity Measurement Collector $IMC_2$ of the Access Authorizer AA.

According to the invention, the four components, i.e., the Network Access Requester NAR, the Policy Enforcer PE, the Network Access Authorizer NAA and the User Authentication Service Unit UASU, constitute a network access layer. The Network Access Requester NAR communicates with the Network Access Authorizer NAA via the Network Authorization Transport Protocol Interface IF-T, the Policy Enforcer PE communicates with the Network Access Authorizer NAA via the Policy Enforcement Point Interface IF-PEP, and the Network Access Authorizer NAA communicates with the User Authentication Service Unit UASU via the User Authentication Authorization Interface IF-UAA. At the network access layer, a secure channel is pre-established between the Policy Enforcement Point PEP and the Network Access Authorizer NAA. The Network Access Requester NAR, the Network Access Authorizer NAA and the User Authentication Service Unit UASU execute a tri-element peer authentication protocol through the Policy Executor PE to enable bidirectional user authentication and key negotiation of the Access Requester AR and the Access Authorizer AA. A primary key generated during authentication is transmitted from the Network Access Authorizer NAA to the Policy Enforcer PE over the secure channel. The Policy Enforcer PE uses the primary key for key negotiation with the Access Requester AR to protect data Transport between the Policy Enforcement Point PEP and the Access Authorizer AA for security. The network access layer is responsible for bidirectional user authentication and key negotiation between the Access Requester AR and the Access Authorizer AA, key negotiation between the Access Requester AR and the Policy Enforcement Point PEP, and mutual access control between the Access Authorizer AA and the Access Requester AR.

The three entities, i.e., the TNC Client TNCC, the TNC Server TNCS and the Platform Evaluation Service Unit PESU, constitute an integrity evaluation layer. The TNC Client TNCC communicates with the TNC Server TNCS via the integrity evaluation TNC Client-Server Interface IF-TNCCS, and the TNC Server TNCS communicates with the Platform Evaluation Service Unit PESU via the Platform Evaluation Authorization Interface IF-PEA. At the integrity evaluation layer, integrity evaluation includes platform integrity verification and platform credential authentication. There are two platform integrity evaluation approaches at the integrity evaluation layer and both of which will be detailed hereinafter.

Figure 3:
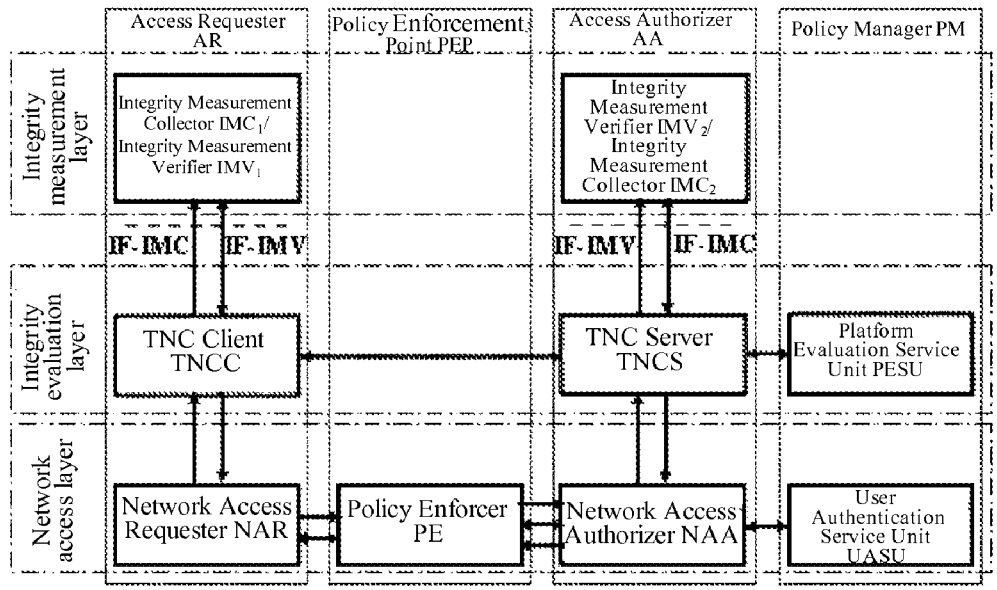
FIG. 3 is a schematic diagram of a process of complete information Transport corresponding to a first platform integrity evaluation approach according to the invention.

In the first platform integrity evaluation approach illustrated in FIG. 3, the Policy Manager PM verifies AIK certificates of the Access Requester AR and the Access Authorizer AA for validity, and the Access Requester AR and the Access Authorizer AA verify locally platform integrity of one another, and this approach is applicable to the case that both the Access Requester AR and the Access Authorizer AA can access a database storing standard integrity measure value of the respective platform components to thereby achieve enhanced security and simplified key management of the trusted network connect architecture. Particularly, the first platform integrity evaluation approach is as follows: (1) platform integrity verification: platform integrity verification of the Access Requester AR is performed at the TNC Service TNCS, and platform integrity verification of the Access Authorizer AA is performed at the TNC Client TNCC. (2) Platform credential authentication: platform credential authentication of the Access Requester AR and the Access Authorizer AA is performed with the tri-element peer authentication protocol. AIK certificate authentication of both the Access Requester AR and the Access Authorizer AA is performed by the Platform Evaluation Service Unit PESU.

Figure 4:
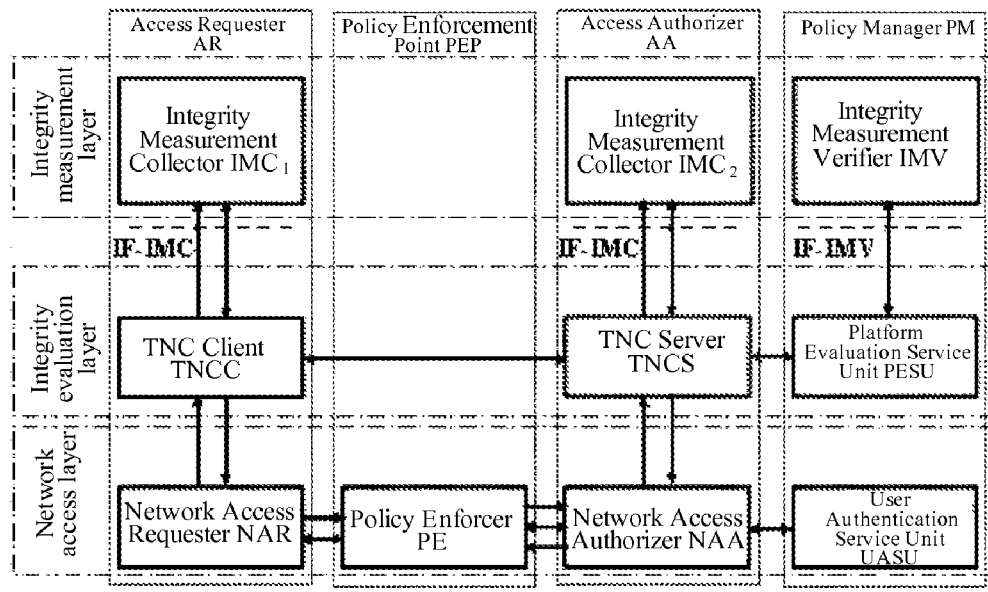
FIG. 4 is a schematic diagram of a process of complete information Transport corresponding to a second platform integrity evaluation approach according to the invention.

In the second platform integrity evaluation approach illustrated in FIG. 4, both AIK certificate validity verification and platform integrity verification of the Access Requester AR and the Access Authorizer AA are performed by the Policy Manager PM to thereby achieve simplified key management and integrity verification mechanisms, further enhanced security and an extended application scope of the trusted network connect architecture. Particularly, the second platform integrity evaluation approach is as follows: (1) platform integrity verification: platform integrity verification of both the Access Requester AR and the Access Authorizer AA is performed by the Platform Evaluation Service Unit PESU. (2) Platform credential authentication: platform credential authentication of the Access Requester AR and the Access Authorizer AA is performed with the tri-element peer authentication protocol. AIK certificate validity verification of both the Access Requester AR and the Access Authorizer AA is performed by the Platform Evaluation Service Unit PESU.

An integrity measurement layer is responsible for collecting and verifying platform integrity information of the Access Requester AR and the Access Authorizer AA.

In the case of the first platform integrity evaluation approach, the Access Requester AR and the Access Authorizer AA both collect and verify platform integrity information. The integrity measurement layer of this structure mainly includes four components, i.e., the Integrity Measurement Collector $IMC_1$ of the Access Requester AR, the Integrity Measurement Verifier $IMV_1$ of the Access Requester AR, the Integrity Measurement Verifier $IMV_2$ of the Access Authorizer AA, and the Integrity Measurement Collector $IMC_2$ of the Access Authorizer AA. The Integrity Measurement Collector $IMC_1$ of the Access Requester AR communicates with the Integrity Measurement Verifier $IMV_2$ of the Access Authorizer AA via the Integrity Measurement Interface IF-M, and the Integrity Measurement Verifier $IMV_1$ of the Access Requester AR communicates with the Integrity Measurement Collector $IMC_2$ of the Access Authorizer AA via the Integrity Measurement Interface IF-M.

In the case of the second platform integrity evaluation approach, the Access Requester AR and the Access Authorizer AA only collect platform integrity information, and the Policy Manager PM verifies the platform integrity information. The integrity measurement layer of this structure mainly includes three components, i.e., the Integrity Measurement Collector $IMC_1$ of the Access Requester AR, the Integrity Measurement Collector $IMC_2$ of the Access Authorizer AA, and the Integrity Measurement Verifier IMV of the Policy Manager PM. The Integrity Measurement Collector $IMC_1$ of the Access Requester AR communicates with the Integrity Measurement Verifier IMV of the Policy Manager PM via the Integrity Measurement Interface IF-M, and the Integrity Measurement Collector $IMC_2$ of the Access Authorizer AA communicates with the Integrity Measurement Verifier IMV of the Policy Manager PM via the Integrity Measurement Interface IF-M.

Referring to FIG. 3 and FIG. 4, specific steps of the invention to implement a trusted network connection with enhanced security are as follows:

(1.) Performing initialization. The following steps are performed prior to establishment of a network connection:

(1.1) The TNC Client TNCC of the Access Requester AR prepares and submits platform integrity information to the Integrity Measurement Collector $IMC_1$ of the Access Requester AR; and the TNC Server TNCS of the Access Authorizer AA prepares and submits platform integrity information to the Integrity Measurement Collector $IMC_2$ of the Access Authorizer AA.

(1.2) The TNC Client TNCC and the TNC Server TNCS predefine integrity verification requirements each including a lists of PCRS which the Access Requester AR and Access Authorizer AA request one another for verifying. In the case of the first platform integrity evaluation approach, the TNC Client TNCC and the TNC Server TNCS submit the predefined the integrity verification requirements directly to the Integrity Measurement Verifier $IMV_1$ of the Access Requester AR and the Integrity Measurement Verifier $IMV_2$ of the Access Authorizer AA. In the case of the second platform integrity evaluation approach, the TNC Client TNCC and the TNC Server TNCS submit the predefined the integrity verification requirements to the Integrity Measurement Verifier IMV of the Policy Manager PM only during platform integrity evaluation as illustrated in FIG. 4.

(1.3) Trusted platform modules of the Access Requester AR and the Access Authorizer AA hash platform information required for a network policy and then store it in platform configuration registers.

(2.) Performing user authentication.

(2.1) At the network access layer, the Network Access Requester NAR initiates an access request to the Policy Enforcer PE, and the Policy Enforcer PE forwards the access request to the Network Access Authorizer NAA.

(2.2) The Network Access Authorizer NAA initiates a bidirectional user authentication process upon reception of the access request, and the tri-element peer authentication protocol is executed between the Network Access Requester NAR, the Network Access Authorizer NAA and the User Authentication Service Unit UASU at the network access layer to perform bidirectional user authentication and key negotiation of the Access Requester AR and the Access Authorizer AA. Thereafter, the Network Access Authorizer NAA transmits a primary key generated during bidirectional user authentication to the Policy Enforcement Point PEP over a pre-established secure channel. Finally, the Policy Enforcement Point PEP uses the primary key for key negotiation with the Access Requester AR.

(2.3) Upon successful bidirectional user authentication, the Network Access Requester NAR and the Network Access Authorizer NAA transmit user authentication success information respectively to the TNC Client TNCC and the TNC Server TNCS at the integrity evaluation layer.

(3.) Performing integrity evaluation.

When the TNC Server TNCS of the Access Authorizer AA receives user authentication success information transmitted from the Network Access Authorizer NAA, the TNC Server TNCS of the Access Authorizer AA, the TNC Client TNCC of the Access Requester AR and the Platform Evaluation Service Unit PESU of the Policy Manager PM perform bidirectional platform integrity evaluation of the Access Requester AR and the Access Authorizer AA with the tri-element peer authentication protocol.

Referring to FIG. 3, the first platform integrity evaluation is implemented as follows: (1) platform integrity verification: the access requester verifies platform integrity of the access authorizer, and the access authorizer verifies platform integrity of the access requester; and (2) platform credential authentication: the policy manager verifies AIK certificates of the access requester and the access authorizer for validity Referring to FIG. 4, the second platform integrity evaluation is implemented as follows: (1) platform integrity verification: the policy manager verifies platform integrity of the access requester and the access authorizer; and (2) platform credential authentication: the policy manager verifies AIK certificates of the access requester and the access authorizer for validity.

(4) Performing access control.

The TNC Client TNCC and the TNC Server TNCS summarizes respectively platform integrity evaluation results of the Access Authorizer and the Access Requester AR and then transmit recommendations respectively to the Network Access Requester NAR and the Network Access Authorizer NAA. The Network Access Requester NAR and the Network Access Authorizer NAA controls ports respectively according to the respective received recommendations to perform mutual access control of the Access Requester AR and the Access Authorizer AA. The recommendations transmitted from the TNC Client TNCC and the TNC Server TNCS to the Network Access Requester NAR and the Network Access Authorizer NAA include access permission information, access prohibition information, isolation and restoration information, etc.

In the foregoing embodiment of the invention, access control based on tri-element peer authentication is performed at the network access layer to achieve enhanced security and simplified key management of the trusted network connect architecture.

Furthermore, platform integrity evaluation according to the invention can select implementation approach thereof according to actual condition. In the first approach, the policy manager performs centralized authentication of AIK certificates of the access requester and the access authorizer, and the access requester and the access authorizer verify locally platform integrity of one another, and this approach is applicable to the case that both the access requester and the access authorizer can access a database storing standard integrity measure value of the respective components to thereby achieve enhanced security and simplified key management of the trusted network connect architecture. In the second approach, both AIK certificate authentication and platform integrity verification of the access requester and the access authorizer are performed by the policy manager to thereby achieve simplified key management and integrity verification mechanisms, further enhanced security and an extended application scope of the trusted network connect architecture.

Furthermore, the invention performs not only bidirectional user authentication of the access requester and the access authorizer at the network access layer but also bidirectional platform integrity evaluation of the access requester and the access authorizer at the integrity evaluation layer to thereby enhance security throughout the trusted network connect architecture. Furthermore, security throughout the trusted network connect architecture is further enhanced due to the use of the tri-element peer authentication protocol, i.e., a third party-based bidirectional authentication protocol, at both the network access layer and the integrity evaluation layer.

The trusted network connect system with enhanced security according to the invention has been described as above, the principle and embodiments of the invention have been set forth in the context by way of specific examples, and the foregoing descriptions of the embodiments are merely intended to facilitate understanding of the solutions of the invention; and those ordinarily skilled in the art can make variations to the embodiments and application scopes in light of the spirit of the invention, and the disclosure of the description should not be construed as a limitation to the present invention.

What is claimed is:

1. A trusted network connect system with enhanced security, comprising an Access Requester AR and a Policy Enforcement Point PEP, wherein the system further comprises an Access Authorizer AA and a Policy Manger PM;
   the Access Requester AR and the Policy Enforcement Point PEP are networked in an authentication protocol, the Access Requester AR and the Access Authorizer AA are networked via a Network Authorization Transport Protocol Interface IF-T and an integrity evaluation TNC Client-Server Interface IF-TNCCS, both the Access Requester AR and the Access Authorizer AA are provided with Integrity Measurement Interfaces IF-Ms, the Policy Enforcement Point PEP and the Access Authorizer AA are networked via a Policy Enforcement Point Interface IF-PEP, and the Access Authorizer AA and the Policy Manager PM are networked via a User Authentication Authorization Interface IF-UAA and a Platform Evaluation Authorization Interface IF-PEA; wherein
   the Network Authorization Transport Protocol Interface IF-T is a protocol interface via which bidirectional user authentication and key negotiation between the Access Requester AR and the Access Authorizer AA is performed and mutual access control of the Access Requester AR and the Access Authorizer AA is performed;
   the integrity evaluation TNC Client-Server Interface IF-TNCCS is a protocol interface via which platform integrity evaluation between the Access Requester AR and the Access Authorizer AA is performed through verifying, by the Policy Manager PM, AIK certificates of the Access Requester AR and the Access Authorizer AA for validity and through verifying, by the Policy Manager PM, platform integrity of the Access Requester AR and the Access Authorizer AA;
   the Integrity Measurement Interface IF-M is a protocol interface via which platform integrity-related information of the Access Requester AR and the Access Authorizer AA is collected and verified;
   the Policy Enforcement Point Interface IF-PEP is a protocol interface via which a decision of the Access Authorizer AA is executed;
   the User Authentication Authorization Interface IF-UAA is a protocol interface via which bidirectional user authentication and key negotiation between the Access Requester AR and the Access Authorizer AA is performed and mutual access control between the Access Requester AR and the Access Authorizer AA is performed;
   the Platform Evaluation Authorization Interface IF-PEA is a protocol interface via which platform integrity evaluation between the Access Requester AR and the Access Authorizer AA is performed, the Policy Manager PM verify the AIK certificates of the Access Requester AR and the Access Authorizer AA for validity, and the Policy Manager PM verifies platform integrity of the Access Requester AR and the Access Authorizer AA.

2. The trusted network connect system with enhanced security according to claim 1, wherein:
   the Access Requester AR comprises a Network Access Requester NAR, a TNC Client TNCC, and an Integrity Measurement Collector $IMC_1$ and an Integrity Measurement Verifier $IMV_1$ of the Access Requester AR, wherein the Network Access Requester NAR communicates with the TNC Client TNCC over a data bearer, the TNC Client TNCC communicates with the Integrity Measurement Collector $IMC_1$ of the Access Requester AR via an Integrity Measurement Collection Interface IF-IMC and the TNC Client TNCC communicates with the Integrity Measurement Verifier $IMV_1$ of the Access Requester AR via an Integrity Measurement Verification Interface IF-IMV;
   the Policy Enforcement Point PEP comprises a Policy Executor PE for executing a decision of the Access Authorizer AA;
   the Access Authorizer AA comprises a Network Access Authorizer NAA, a TNC Server TNCS, and an Integrity Measurement Verifier $IMV_2$ of and an Integrity Measurement Collector $IMC_2$ of the Access Authorizer AA, wherein the Network Access Authorizer NAA communicates with the TNC Server TNCS over a data bearer, the TNC Server TNCS communicates with the Integrity Measurement Collector $IMC_2$ of the Access Authorizer AA via the Integrity Measurement Collection Interface IF-IMC and the TNC Server TNCS communicates with the Integrity Measurement Verifier $IMV_2$ of the Access Authorizer AA via the Integrity Measurement Verification Interface IF-IMV;
   the Policy Manager PM comprises a User Authentication Service Unit UASU and a Platform Evaluation Service Unit PESU, wherein the User Authentication Service Unit UASU communicates with the Platform Evaluation Service Unit PESU over a data bearer;

the Network Access Requester NAR communicates with the Policy Enforcer PE in the authentication protocol, the Policy Enforcer PE communicates with the Network Access Authorizer NAA via the Policy Enforcement Point Interface IF-PEP, the Network Access Requester NAR communicates with the Network Access Authorizer NAA via the Network Authorization Transport Protocol Interface IF-T, and the Network Access Authorizer NAA communicates with the User Authentication Service Unit UASU via the User Authentication Authorization Interface IF-UAA;

the TNC Client TNCC communicates with the TNC Server TNCS via the integrity evaluation TNC Client-Server Interface IF-TNCCS, and the TNC Server TNCS communicates with the Platform Evaluation Service Unit PESU via the Platform Evaluation Authorization Interface IF-PEA;

the Integrity Measurement Collector $IMC_1$ of the Access Requester AR communicates with the Integrity Measurement Verifier $IMV_2$ of the Access Authorizer AA via the Integrity Measurement Interface IF-M, and the Integrity Measurement Verifier $IMV_1$ of the Access Requester AR communicates with the Integrity Measurement Collector $IMC_2$ of the Access Authorizer AA via the Integrity Measurement Interface IF-M.

3. The trusted network connect system with enhanced security according to claim 2, wherein the Integrity Measurement Collector $IMC_1$ of the Access Requester AR is a component for collecting platform integrity information prepared by the TNC Client TNCC; the Integrity Measurement Verifier $IMV_1$ of the Access Requester AR is a component for verifying platform integrity information of the Access Authorizer AA transmitted from the TNC Server TNCS; the Integrity Measurement Collector $IMC_2$ of the Access Authorizer AA is a component for collecting platform integrity information prepared by the TNC Server TNCS; and the Integrity Measurement Verifier $IMV_2$ of the Access Authorizer AA is a component for verifying platform integrity information of the Access Requester AR transmitted from the TNC Client TNCC.

4. The trusted network connect system with enhanced security according to claim 2, wherein both the Access Requester AR and the Access Authorizer AA are logic entities with trusted platform modules.

5. The trusted network connect system with enhanced security according to claim 3, wherein both the Access Requester AR and the Access Authorizer AA are logic entities with trusted platform modules.

6. The trusted network connect system with enhanced security according to claim 1, wherein:

the Access Requester AR comprises a Network Access Requester NAR, a TNC Client TNCC, and an Integrity Measurement Collector $IMC_1$ of the Access Requester AR, wherein the Network Access Requester NAR communicates with the TNC Client TNCC over a data bearer, the TNC Client TNCC communicates with the Integrity Measurement Collector $IMC_1$ of the Access Requester AR via an Integrity Measurement Collection Interface IF-IMC;

the Policy Enforcement Point PEP comprises a Policy Executor PE for executing a decision of the Access Authorizer AA;

the Access Authorizer AA comprises a Network Access Authorizer NAA, a TNC Server TNCS, and an Integrity Measurement Collector $IMC_2$ of the Access Authorizer AA, wherein the Network Access Authorizer NAA communicates with the TNC Server TNCS over a data bearer, the TNC Server TNCS communicates with the Integrity Measurement Collector $IMC_2$ of the Access Authorizer AA via the Integrity Measurement Collection Interface IF-IMC;

the Policy Manager PM comprises a User Authentication Service Unit UASU, a Platform Evaluation Service Unit PESU and an Integrity Measurement Verifier IMV, wherein the User Authentication Service Unit UASU communicates with the Platform Evaluation Service Unit PESU over a data bearer, and the Platform Evaluation Service Unit PESU communicates with the Integrity Measurement Verifier IMV via an Integrity Measurement Verification Interface IF-IMV;

the Network Access Requester NAR communicates with the Policy Enforcer PE in the authentication protocol, the Policy Enforcer PE communicates with the Network Access Authorizer NAA via the Policy Enforcement Point Interface IF-PEP, the Network Access Requester NAR communicates with the Network Access Authorizer NAA via the Network Authorization Transport Protocol Interface IF-T, and the Network Access Authorizer NAA communicates with the User Authentication Service Unit UASU via the User Authentication Authorization Interface IF-UAA;

the TNC Client TNCC communicates with the TNC Server TNCS via the integrity evaluation TNC Client-Server Interface IF-TNCCS, and the TNC Server TNCS communicates with the Platform Evaluation Service Unit PESU via the Platform Evaluation Authorization Interface IF-PEA;

the Integrity Measurement Collector $IMC_1$ of the Access Requester AR communicates with the Integrity Measurement Verifier IMV of the Policy Manager PM via the Integrity Measurement Interface IF-M, and the Integrity Measurement Collector $IMC_2$ of the Access Authorizer AA communicates with the Integrity Measurement Verifier IMV of the Policy Manager PM via the Integrity Measurement Interface IF-M.

7. The trusted network connect system with enhanced security according to claim 6, wherein the Integrity Measurement Collector $IMC_1$ of the Access Requester AR is a component for collecting platform integrity information prepared by the TNC Client TNCC; the Integrity Measurement Collector $IMC_2$ of the Access Authorizer AA is a component for collecting platform integrity information prepared by the TNC Server TNCS; and the Integrity Measurement Verifier IMV of the Policy Manager PM is a component for receiving platform integrity verification requirements predefined by the TNC Client TNCC and the TNC Server TNCS and for verifying platform integrity of the Access Requester AR and the Access Authorizer AA.

8. The trusted network connect system with enhanced security according to claim 7, wherein both the Access Requester AR and the Access Authorizer AA are logic entities with trusted platform modules.

9. The trusted network connect system with enhanced security according to claim 6, wherein both the Access Requester AR and the Access Authorizer AA are logic entities with trusted platform modules.

10. The trusted network connect system with enhanced security according to claim 1, wherein both the Access Requester AR and the Access Authorizer AA are logic entities with trusted platform modules.

* * * * *